United States Patent [19]
Dhein et al.

[11] Patent Number: 5,304,400
[45] Date of Patent: Apr. 19, 1994

[54] PROCESS FOR COATING HEAT RESISTANT SUBSTRATES WITH TWO COMPONENT STOVING COMPOSITIONS

[75] Inventors: Rolf Dhein, Krefeld-Bockum; Knud Reuter; Burkhard Köhler, both of Krefeld, all of Fed. Rep. of Germany; Rainer Rettig, Amagasaki, Japan; Lothar Bäcker, Dormagen, Fed. Rep. of Germany

[73] Assignee: Bayer Aktiengesellschaft, Leverkusen, Fed. Rep. of Germany

[21] Appl. No.: 821,093

[22] Filed: Jan. 15, 1992

[30] Foreign Application Priority Data

Jan. 22, 1991 [DE] Fed. Rep. of Germany ....... 4101696

[51] Int. Cl.$^5$ ............................................. B05D 3/02
[52] U.S. Cl. .............................. 427/388.4; 427/388.2; 427/393; 427/393.5
[58] Field of Search ................. 427/388.4, 393, 393.5, 427/388.2, 408, 409, 412.1

[56] References Cited

U.S. PATENT DOCUMENTS

| | | | |
|---|---|---|---|
| 3,914,335 | 10/1975 | Tugukuni et al. | 260/859 R |
| 3,992,477 | 11/1976 | Dickie et al. | 427/409 |
| 4,013,806 | 3/1977 | Volkert et al. | 427/393.5 |
| 4,140,836 | 2/1979 | Wallace | 427/388.4 |
| 4,210,702 | 7/1980 | Dalibor | 427/388.5 |
| 4,452,834 | 6/1984 | Nachtkamp et al. | 427/388.4 |
| 4,558,090 | 12/1985 | Drexler et al. | 427/407.1 |
| 4,713,265 | 12/1987 | Nahas et al. | 427/393.5 |
| 4,732,618 | 3/1988 | Spietschka et al. | 106/288 Q |
| 4,759,961 | 7/1988 | Kato et al. | 427/409 |
| 4,761,212 | 8/1988 | Watanabe et al. | 427/409 |
| 5,066,687 | 11/1991 | Rieper et al. | 523/205 |
| 5,075,370 | 12/1991 | Kubitza et al. | 524/591 |
| 5,130,167 | 7/1992 | Mitsuji et al. | 427/410 |
| 5,158,808 | 10/1992 | Hoy et al. | 427/388.4 |

FOREIGN PATENT DOCUMENTS

| | | |
|---|---|---|
| 263983 | 4/1988 | European Pat. Off. . |
| 3829587 | 3/1990 | Fed. Rep. of Germany . |
| 1530021 | 10/1978 | United Kingdom . |
| 1530022 | 10/1978 | United Kingdom . |

OTHER PUBLICATIONS

"WäBrige Zweikomponenten-Polyurethan-Reaktiv-Systeme in der Beschichtungstechnik (Water-Based Two-Component Reactive Polyurethane Systems in Coating Technology)" (proceedings of the XX FATIPEC Congress, Nezza, 17th-21st, Sep. 1990, pp. 239-245. (in German, Not translated).

*Primary Examiner*—Terry J. Owens
*Assistant Examiner*—Diana Dudash
*Attorney, Agent, or Firm*—Joseph C. Gil; Thomas W. Roy

[57] ABSTRACT

The present invention relates to a process for preparing a coated, heat resistant substrate by I) coating the substrate with a coating composition containing
  a) a solution or dispersion containing
   a1) 100 parts by weight of at least one hydroxyl-functional polyacrylate resin in dissolved or dispersed form, wherein the resin has a hydroxyl value of 15 to 200 mg KOH/G solid resin, an acid value of 5 to 250 mg KOH/G solid resin and a total content of chemically incorporated carboxylate and/or sulfonate groups of 8 to 450 milliequivalents per 100 g of solids,
   a2) 25 to 395 parts by weight of water and
   a3) 5 to 125 parts by weight of at least one organic solvent having a boiling point or boiling range at 1013 mbar of 100 to 300° C. and
  b) at least one organic polyisocyanate in a quantity corresponding to an equivalent ratio of isocyanate groups of component b) to isocyanate-reactive groups of component a1) of 0.7:1 to 3:1, and
II) curing the coating composition at a temperature of 40 to The present invention is also directed to the coated substrates obtained by this process.

5 Claims, No Drawings

PROCESS FOR COATING HEAT RESISTANT SUBSTRATES WITH TWO COMPONENT STOVING COMPOSITIONS

BACKGROUND OF THE INVENTION

1. Field of the Invention

This invention relates to a process for coating heat resistant substrates with aqueous stoving compositions based on organic solutions or dispersions of polyacrylate resins and organic polyisocyanates and to the coated substrates produced therefrom.

2. Description of the Prior Art

Reduction of the organic solvent content of lacquers is a primary concern in many fields of application for ecological and factory hygiene reasons. Accordingly, the at least partial replacement of organic lacquer solvents by water is of considerable importance in modern coating technology.

The stoving compositions predominantly used for industrially applied coatings, for example, for coating metals (original and repair lacquering of automobiles, coating of domestic appliances, etc.) either require stoving temperatures of 130° C. and higher (for example melamine resin crosslinking, powder coatings, epoxy resin crosslinking) or, as non-aqueous systems, contain relatively large quantities of organic solvents (for example two-component polyurethane lacquers). Accordingly, there is a considerable need for lacquer systems which can be stoved at relatively low temperatures, i.e., energy-saving lacquer systems, and which can be quickly and completely crosslinked to hard, elastic and solvent-resistant coatings.

Accordingly, an object of the present invention is to provide a new coating composition which can be applied from a predominantly aqueous phase and which can be cured at only moderately elevated temperatures to obtain high quality lacquer films without the release of decomposition products, for example, blocking agents for polyisocyanates.

Lacquer systems of this type have not previously been known. For example, the water-based lacquer systems according to DE-OS 2 507 842 or DE-OS 2 507 884 rely on the use of blocked polyisocyanates while the systems according to DE-OS 38 29 587 are cured at room temperature without any indication as to how the systems would have to be modified to obtain high-quality stoving lacquers. The same observation is justified in regard to the paper entitled "WäBrige Zweikomponenten-Polyurethan-Reaktiv-Systeme in der Beschichtungstechnik (Water-Based Two-Component Reactive Polyurethane Systems in Coating Technology)"(-proceedings of the XX FATLPEC Congress, Nizza, 17th to 21st September, 1990, pages 239 to 245).

The object stated above may be achieved in accordance with the present invention which is described in detail hereinafter.

SUMMARY OF THE INVENTION

The present invention relates to a process for preparing a coated, heat resistant substrate by
I) coating the substrate with a coating composition containing
 a) a solution or dispersion containing
  a1) 100 parts by weight of at least one hydroxyl-functional polyacrylate resin in dissolved or dispersed form, wherein the resin has a hydroxyl value of 15 to 200 mg KOH/G solid resin, an acid value of 5 to 250 mg KOH/G solid resin and a total content of chemically incorporated carboxylate and/or sulfonate groups of 8 to 450 milliequivalents per 100 g of solids,
  a2) 25 to 395 parts by weight of water and
  a3) 5 to 125 parts by weight of at least one organic solvent having a boiling point or boiling range at 1013 mbar of 100° to 300° C. and
 b) at least one organic polyisocyanate in a quantity corresponding to an equivalent ratio of isocyanate groups of component b) to isocyanate-reactive groups of component a1) of 0.7:1 to 3:1, and
II) curing the coating composition at a temperature of 40° to 160° C.

The present invention is also directed to the coated substrates obtained by this process.

DETAILED DESCRIPTION OF THE INVENTION

Component a) of the mixtures according to the invention are based on aqueous organic solutions or dispersions of hydroxyl-functional polyacrylate resins a1) in a2) water and a3) organic solvents which may optionally contain a4) auxiliaries and additives of the type known from polyacrylate chemistry. However, this does not mean that, in the production of the mixtures to be used in accordance with the invention, all of the substituents of solution or dispersion a) have to be present prior to mixing this component with component b) and optionally c). This is only one possible method for preparing the mixtures to be used in accordance with the invention. A variant of this method for preparing the mixtures according to the invention would be to initially mix a1) with a portion of a2) and/or a3) in dissolved or dispersed form and to incorporate the remaining portion of a2) and a3) in the mixture at the same time as or after b). Accordingly, the important feature is that the stated quantities of the individual components be present in the ready-to-use coating composition containing a mixture of a), b) and optionally c). The above discussion is merely intended to describe the composition to be used in accordance with the invention and does not represent a limitation with respect to the process to be used to be prepare the composition.

The polyacrylate resins a1) are hydroxy-functional copolymers which have a hydroxyl value of 15 to 200 mg KOH/g, an acid value of 5 to 250 mg KOH/g and a content of chemically incorporated carboxylate and-/or sulfonate groups of 8 to 450 milliequivalents per 100 9 of solids. The acid value relates to both free, non-neutralized acid groups (which are preferably carboxyl groups) and to the neutralized acid groups (which are preferably carboxyl ate groups). The copolymers have a molecular weight ($M_n$, as determined by gel permeation chromatography using polystyrene as standard) of 500 to 50,000, preferably 1,000 to 25,000.

The copolymers a1) are prepared from
A: 1 to 30%, preferably 1 to 10%, by weight of acrylic acid and/or methacrylic acid,
B: 0 to 50% by weight of methyl methacrylate,
C: 0 to 50% by weight of styrene,
D: 10 to 45% by weight of at least one $C_{1-8}$ alkyl acrylates,
E: 5 to 45% by weight of at least one monohydroxy-functional alkyl acrylates or alkyl methacrylates and F: 0 to 15% by weight of other olefinically unsaturated monomers, wherein the sum of B and C is 10 to 70% by weight and the sum of A to F being 100% by weight. 5 to 100% of the chemically incorporated acid groups are neutralized with aliphatic amines or with ammonia to obtain the quantity of anionic salt groups described above.

The unsaturated acids incorporated through component A and optionally F are at least partly neutralized so that the resulting anionic groups ensure or at least facilitate the solubility or dispersibility of the copolymers in water. When only low concentrations of salt groups are present, the solubility or dispersibility of the copolymers in water may be assisted by the use of external emulsifiers. The copolymers must be dilutable with water to form either a dispersion or a colloidally to molecularly disperse "solution." When the copolymers a1) are prepared by emulsion polymerization, methacrylic acid is preferably used; whereas, when the copolymers are prepared by solution polymerization, acrylic acid is the preferred monocarboxylic acid A.

Monomers B and C may be varied to the extent that only one of the monomers is present to achieve the quantity of B and C of 10 to 70% by weight. In this case methyl methacrylate is preferred. More preferably, both methyl methacrylate and styrene are used.

Suitable $C_{1-8}$ alkyl acrylates D include methyl acrylate, ethyl acrylate, n-propyl acrylate, isopropyl acrylate, n-butyl acrylate, isobutyl acrylate, n-hexyl acrylate, n-octyl acrylate and 2-ethylhexyl acrylate. Preferred $C_{1-8}$ alkyl acrylates D include n-butyl acrylate, n-hexyl acrylate and 2-ethylhexyl acrylate; more preferred are n-butyl acrylate and n-hexyl acrylate.

Suitable hyroxyl-functional (meth)acrylates E include hydroxyethyl (meth)acrylate, 2-hydroxypropyl (meth)acrylate, 3-hydroxypropyl (meth)acrylate, 4-hydroxybutyl (meth)acrylate and mixtures of these monomers. 2-hydroxyethyl methacrylate and mixtures of 2- and 3-hydroxypropyl methacrylate are preferred.

The other monomer units F include substituted styrene derivatives such as the isomeric vinyl toluenes, $\alpha$-methyl styrene and propenyl benzene; $C_{5-12}$ cycloalkyl (meth)acrylates; vinyl esters such as vinyl acetate, propionate and versatate; and vinyl sulfonic acid. The total quantity of polymerizable acids (carboxylic acids A plus any acids present in F) should not exceed 30% by weight.

Ammonia or aliphatic amines such as triethyl amine, 2-amino-2-methyl-l-propanol, dimethyl ethanolamine, diethyl ethanolamine and any other aliphatic amines, preferably having a molecular weight of 31 to 200, may be used to at least partially neutralize the acid groups present in copolymerized form.

Component a3) is an organic solvent which boils below 300° C., preferably at 100° to 250° C., under normal pressure (1,013 mbar). The organic solvents preferably have a solubility parameter $\delta$ (in accordance with H. Burrell's Table in Polymer Handbook, John Wiley & Sons, New York/London/Sydney/Toronto, 2nd Edition, pages IV-341 to 344) of 8.0 to 12.6 cal$^{\frac{1}{2}}$ cm$^{-3/2}$. For solvents which are not listed, the solubility parameters may be calculated by Small's method, which is described therein on page IV-338/339 (original lit.: P.A. Small, J. Appl. Chem. 3, 71 (1953)), from the structural parameters set forth therein as well as from molecular weight and density as measured at 25° C. Preferred solvents corresponding to these definitions contain ether and/or ester groups in the molecule and are compatible with water at least to an extent such that the solutions or dispersions a) represent systems containing a homogeneously dispersed H$_2$O/co-solvent phase.

Examples of suitable solvents a3) include 1,4-dioxane ($\delta=10.0$), 1,3,5-trioxane, diethylene glycol dimethyl ether (diglyme), 1,3-dioxolane ($\delta=10.2$), ethylene glycol diacetate, butyl diglycol acetate and mixtures thereof. It is also possible, although not preferred, to use small quantities of solvents containing isocyanate-reactive groups, for example, alcohols of comparatively high volatility such as n-butanol or isobutanol.

The copolymers a1) may be produced by solution polymerization in organic solvents. Suitable solvents include toluene, xylene, chlorobenzene, ethyl or butyl acetate, methyl or ethyl glycol acetate, methoxypropyl acetate, butyl glycol, dioxane, ethylene glycol mono- or diethyl ether, acetone, butanone, methylene chloride and mixtures of these solvents. However, when copolymers a1) are produced in solution, solvents which are suitable for use as component a3) are preferably used as the solvent, so that the solvent does not have to be removed on completion of the copolymerization reaction. When solvents which do not satisfy the requirements of component a3) are used, they must be removed before the production of the solutions or dispersions a).

Suitable polymerization initiators for the radical solution polymerization include aliphatic azo compounds such as azoisobutyronitrile (AIBN) or peroxide compounds such as benzoyl peroxide, tert. butyl peroctoate, tert. butyl perpivalate, tert. butyl perbenzoate and di-tert. butyl peroxide. Suitable regulators include sulfur compounds such as dodecyl mercaptan (dodecanethiol) and thioglycol.

On completion of the polymerization reaction, the solutions or dispersions a) are preferably prepared by introducing the organic polymer solution into water a2) which may contain a neutralizing agent. When solvents satisfying the requirements of component a3) have been used in the preparation of the polymers, solutions or dispersions a) are directly formed which are suitable for use in accordance with the invention. When solvents which do satisfy the requirements of component a3) have been used, they have to be replaced by suitable solvents a3). This may be done before or after mixing the copolymer solution with water by distilling off the unsuitable solvent and adding a suitable solvent in any order.

In accordance with the present invention it is preferred to prepare the copolymers a1) directly in the form of an aqueous dispersion by emulsion polymerization. Preferred radical initiators for the emulsion polymerization include peroxodisulfates such as potassium or ammonium peroxodisulfate. External emulsifiers may also be used in the production of the copolymers a1) by emulsion polymerization and, after production of the copolymers, may remain in the system as auxiliary solvents a4). Examples of suitable external emulsifiers include anionic emulsifiers such as those based on alkyl sulfates, alkyl aryl sulfonates and alkylphenol polyether sulfates, as described for example in Houben-Weyl, Methoden der organischen Chemie, Erweiterungsund Folgebande, 4th Edition, Vol. E 20 (part 1, pages 259–262). Additional examples include nonionic emulsifiers such as the alkoxylation products, preferably ethoxylation products, of alkanols, phenols and fatty acids. When emulsifiers such as these are present, only minimal neutralization of the acid groups present is generally sufficient to guarantee the homogeneity of the solutions or dispersions a).

The neutralizing agents may be incorporated during the emulsion polymerization reaction. In this case, it is generally sufficient to add the solvent a3) to the copolymer a1) emulsified in water for the production of the solutions or dispersions a) to be used in accordance with the invention.

Even when copolymers a1) are produced by solution polymerization, external emulsifiers may be used for the production of the solutions or dispersions a).

To produce the mixtures to be used in accordance with the invention, components a1) to a3) are mixed in quantities such that for every 100 parts by weight of component a1), there are 25 to 395 parts by weight of component a2) (water) and 5 to 125 parts by weight of component a3) (solvent). The solvent a3) is present in a quantity of at most 160% by weight, preferably at most 65% by weight, based on the weight of water a2). The quantities in which the individual components are used are also preferably selected so that the weight of component a1) makes up 20 to 60% of the total weight of component a).

Polyisocyanates suitable as component b) include the so-called "lacquer polyisocyanates" containing aromatically and (cyclo)aliphatically bound isocyanate groups, preferably (cyclo)aliphatic polyisocyanates. Suitable "lacquer polyisocyanates" include those based on hexamethylene diisocyanate, 1-isocyanato-3,3,5-trimethyl-5-isocyanatomethyl cyclohexane (IPDI) and/or bis-(isocyanatocyclohexyl)-methane, preferably those based solely on hexamethylene diisocyanate. "Lacquer polyisocyanates" based on these diisocyanates include the known derivatives of these diisocyanates containing bioret, urethane, uretdione and/or isocyanurate groups which, after their production, have been freed from excess starting diisocyanate to a residual content of less than 0.5% by weight by known methods, preferably by distillation. Preferred aliphatic polyisocyanates to be used in accordance with the invention include bioret group-containing polyisocyanates prepared from hexamethylene diisocyanate, for example, by the processes according to U.S. Pat. Nos. 3,124,605, 3,358,010, 3,903,126, 3,903,127 or 3,976,622 (the disclosures of which are herein incorporated by reference) which contain mixtures of N,N',N"-tris-(6-isocyanatohexyl)-biuret with small quantities of its higher homologs; isocyanurate group-containing polyisocyanates prepared from hexamethylene diisocyanate in accordance with U.S. Pat. No. 4,324,879 (herein incorporated by reference) and which consist essentially of N,N',N"-tris-(6-isocyanatohexyl)-isocyanurate in admixture with small quantities of its higher homologs. Particularly preferred are mixtures of uretdione and and optionally isocyanurate group-containing polyisocyanates which are formed by catalytic oligomerization of hexamethylene diisocyanate using trialkyl phosphines, especially those having a viscosity at 23° C. of 50 to 500 mPa.s and an NCO functionality of 2.2 to 5.0.

The aromatic polyisocyanates which are also suitable, although less preferred, for the present invention include "lacquer polyisocyanates" based on 2,4-diisocyanatotoluene or mixtures thereof with 2,6-diisocyanatotoluene or based on 4,4'-diisocyanatodiphenyl methane or mixtures thereof with its isomers and/or higher homologs. Aromatic lacquer polyisocyanates include the isocyanates containing urethane groups which are obtained by reacting excess quantities of 2,4-diisocyanatotoluene with polyhydric alcohols, such as trimethylol propane, and subsequently removing unreacted excess diisocyanate by distillation. Other aromatic lacquer polyisocyanates include isocyanurate group-containing polyisocyanates prepared from the monomeric diisocyanates previously described which have also been freed from excess monomeric diisocyanates, preferably by distillation, after their production.

It is also possible to use unmodified polyisocyanates of the type previously mentioned by way of example if they satisfy the above-mentioned viscosity requirements.

The polyisocyanate component b) may also be based on mixtures of the polyisocyanates previously mentioned.

Another method of producing the mixtures to be used in accordance with the invention, i.e., the mixtures of components a) and b), comprises simply stirring components a) and b) in amounts which are selected to provide an NCO:OH equivalent ratio of 0.7:1 to 3:1, preferably 1:1 to 2.5:1. It is possible to produce the mixtures of the present invention by mixing the individual components in any order. The only requirement is the composition of the mixtures according to the invention and not the order in which the individual components are mixed. For example, a1) may initially be introduced in admixture with a portion of a2) and/or a3) and the remaining portion of a2) and/or a3) may be added at the same time as or after the addition of b). It is also possible to introduce a1) in admixture with a portion of a2) and/or a3), to subsequently add the remainder of a3) in admixture with b) and optionally add any remaining quantities quantities of a2) to adjust the composition to the required viscosity.

Other lacquer auxiliaries and additives c) may optionally be incorporated in the mixtures of a) and b) or in the individual components used for their production.

These auxiliaries and additives include further quantities of water and/or solvents of the type suitable as component a3) for establishing the suitable processing viscosity of the coating compositions according to the invention. The ready-to-use coating compositions according to the invention generally contain 2 to 25% by weight of organic solvents and 10 to 75% by weight of water, based on the total weight of all the components.

Other auxiliaries and additives include pigments, fillers, flow control agents, foam inhibitors/deaerators and the like.

The coating compositions according to the invention may be applied to heat-resistant substrates of any kind by any known methods, such as spray coating, dip coating or spread coating, and may be stoved at 40° to 160° C., preferably at 60° to 140° C., for 15 to 45 minutes. The resulting coatings are scratch-resistant (nail-hard) and solvent-resistant, bubble-free, glossy and - as clear lacquers - transparent.

The coating compositions are particularly suitable for the production of primers or topcoats on wood, metal or plastic substrates, for example, for the production of fillers, base coats and clear coats for either original and repair coatings on motor vehicles.

The invention is further illustrated but is not intended to be limited by the following examples in which all parts and percentages are by weight unless otherwise specified.

EXAMPLES

A two-liter round-bottomed flask equipped with a reflux condenser, stirrer, internal thermometer and nitrogen inlet was used in all of the examples.

EXAMPLE 1

600 parts of diethylene glycol dimethyl ether (DEGDME) were initially introduced into the flask and heated to 100° C. A mixture of 119.4 parts of acrylic acid, 883.0 parts of hydroxypropyl methacrylate, 71.7 parts of styrene, 276.3 parts of methyl methacrylate, 530.5 parts of n-butyl acrylate, 469.7 parts of n-hexyl methacrylate, 36.2 parts of azoisobutyronitrile (AIBN) and 13.3 parts of dodecanethiol was then added over a period of 2.5 h. The reaction mixture was then stirred for 8 h at 110° C.

Thereafter, 50 parts of the polymer solution were neutralized with 2.56 parts of N,N-dimethyl ethanolamine and diluted with 12 parts of DEGDME. A mixture of 18.8 parts of N,N',N''-tris-(6-isocyanatohexyl)-biuret (a commercial product containing small quantities of higher homologs and having an average NCO content of 22.5% by weight and an average viscosity of approx. 3,000 mPa.s/23° C., "biuret polyisocyanate") and 6.8 parts of DEGDME was added to this solution which was then diluted with 104.8 parts of water. Using a film-casting dumbbell, a 180 $\mu$m thick film (wet film thickness) was applied to a glass plate and cured for 30 minutes at 80° C. A bubble-free, transparent, nail-hard, clear coating was obtained.

EXAMPLE 2

50 parts of the polymer solution prepared in Example 1 neutralized with dimethyl ethanolamine were diluted with 12 parts of DEGDMA and 78.8 parts of water. A mixture of 18.8 parts of of the bioret polyisocyanate of Example 1, 6.8 parts of DEGDME and 30 parts of 1,3,5-trioxane was added to the resulting solution and a 180 $\mu$m thick wet film was subsequently cast onto glass as in Example 1. After curing for 30 minutes at 80° C., a nail-hard, transparent, completely bubble-free clear coating was obtained.

EXAMPLE 3

600 parts of water, 3.9 parts of polyethoxylated 3-benzyl-4-hydroxybiphenyl (degree of polyethoxylation approx. 10) and 0.75 parts of sodium di-sec.-butyl naphthalene sulfonate were initially introduced into the flask and heated to 80° C. A solution of 1.25 parts of ammonium peroxodisulfate in 11 parts of water was then added. After 5 minutes at 80° C., a mixture of 117.1 parts of styrene, 16.6 parts of methyl methacrylate, 141.3 parts of butyl acrylate, 107.8 parts of hydroxyethyl methacrylate, 21 parts of methacrylic acid and 7.4 parts of dodecanethiol was added over a period of 2¼ h at 80° C. 0.25 parts of ammonium peroxodisulfate in 12 parts of water were then added, followed by polymerization for 2 h at 80° C. All operations were carried out with intensive stirring. 3.26 parts of dimethyl ethanolamine in 5 parts of water were added to the polymer dispersion. Another 0.14 parts of dimethyl ethanolamine, 9.92 parts of diethylene glycol dimethyl ether and 0.92 parts of the bioret polyisocyanate of Example 1 (NCO:OH equivalent ratio=1:1) were then added to 6.16 parts of this aqueous dispersion. Using a film-casting dumbbell, the emulsion was applied to glass in a wet film thickness of 120 $\mu$m and dried for 30 minutes at 80° C. A clear, glossy, nail-hard coating with no defects was obtained.

EXAMPLE 4

600 parts of water, 3.9 parts of polyethoxylated 3-benzyl-4-hydroxybiphenyl (degree of polyethoxylatiod approx. 10) and 0.75 part sodium di-sec.-butyl naphthalene sulfonate were initially introduced into the flask and heated to 80° C. A solution of 1.25 parts of ammonium peroxodisulfate in 11 parts of water was then added. After 5 minutes at 80° C., a mixture of 117.1 parts of styrene, 52.5 parts of methyl methacrylate, 141.4 parts of butyl acrylate, 72.3 parts of hydroxyethyl methacrylate, 21 parts of methacrylic acid and 7.4 parts of dodecyl mercaptan was added over a period of 2¼ h at 80° C. 0.25 parts of ammonium peroxodisulfate in 12 parts of water was then added, followed by polymerization for 2 h at 80° C. All operations were carried out with intensive stirring.

3.26 parts of dimethyl ethanolamine in 5 parts of water were added to the polymer dispersion. Another 27.62 parts of diethylene glycol dimethyl ether and 2.30 parts of the biuret polyisocyanate of Example 1 (NCO:OH equivalent ratio =1.25:1) were then added to 18.13 parts of of this aqueous dispersion. Using a film-casting dumbbell, the emulsion was applied to glass in a wet film thickness of 300 $\mu$m and dried for 30 minutes at 80° C. A clear, glossy, nail-hard lacquer film with no bubbles or other defects was obtained. After storage for 1 day at room temperature, the coating had a Konig pendulum hardness (DIN 53 157) of 120 seconds.

EXAMPLE 5

600 parts of DEGDME were introduced into the flask and heated to 110° C. A mixture of 143.7 parts of acrylic acid, 708.7 parts of hydroxypropyl methacrylate, 138.4 parts of styrene, 332.7 parts of methyl methacrylate, 741.3 parts of n-butyl acrylate, 282.2 parts of n-hexyl methacrylate, 37.9 parts of AIBN and 14.0 parts of dodecanethiol was then added over a period of 2¼ h, followed by stirring for 8 h at 110° C. Thereafter, the reaction mixture was neutralized with 177.7 parts of dimethyl ethanolamine and diluted with deionized water to a solids content of 27.6%. 50 parts of this solution, 1 part of DEGDME and a mixture of 8.7 parts of the bioret polyisocyanate of Example 1 were stirred with 2.2 parts of DEGDME. Using a film-casting dumbbell, a 180 $\mu$m thick film (wet film thickness) was applied from the mixture to a glass plate and cured for 30 minutes at 80° C. A bubble-free, transparent, nail-hard, clear coating was obtained.

EXAMPLE 6

80 parts of the neutralized polymer solution of Example 5, 116 parts of Bayertitan R-KB-4 (white rutile pigment, a product of Bayer AG), 0.8 parts of Dehydran 671 (foam inhibitor, a product of Henkel KGAA) and 20 parts of deionized water were ground to form a white paste. 117.2 parts of the paste, another 135.5 parts of the neutralized polymer solution of Example 5, 2.8 parts of Dehydran 671 foam inhibitor, 1.6 parts of Byk 301 (flow control agent, a product of Byk Chemie), 25.1 parts of the biuret polyisocyanate of Example 1 and 40 parts of ethylene glycol diacetate were stirred and adjusted with 15 parts of deionized water to a flow viscosity of 25 s from a DIN 4 mm cup (DIN 53 211). The white lacquer was sprayed onto a steel plate in a dry film layer thickness of 35$\mu$m and, after airing for 10 minutes at room temperature, was dried for 30 minutes at 80° C. to form a glossy, pure white coating. A Konig pendulum hardness (DIN 53 157) of 160 seconds was measured after cooling.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a coated, substrate which comprises
   I) coating the substrate with a coating composition comprisin
      a) a solution or dispersion containing
         a1) 100 parts by weight of at least one hydroxyl-functional polyacrylate resin in dissolved or dispersed form, wherein the resin has a hydroxyl value of 15 to 200 mg KOH/G solid resin, an acid value of 5 to 250 mg KOH/G solid resin and a total content of chemically incorporated carboxylate and/or sulfonate groups of 8 to 450 milliequivalents per 100 g of solids,
         a2) 25 to 395 parts by weight of water and
         a3) 5 to 125 parts by weight of at least one organic solvent having a boiling point or boiling point range at 1013 mbar of 100° to 300° C. and
      b) at least one organic polyisocyanate in a quantity corresponding to an equivalent ratio of isocyanate groups of component b) to isocyanate-reactive groups of component a1) of 0.7:1 to 3:1, and
   II) curing the coating composition at a temperature of 40° to 160° C. to form a bubble-free coating.

2. The process of claim 1 wherein component a3) is present in an amount of at most 65% by weight, based on the weight of component a2).

3. The process of claim 1 wherein said solvent contains ether or ester groups.

4. The process of claim 1 which comprises curing the coating composition at a temperature of 60° to 140° C.

5. The process of claim 1 wherein the substrate is wood, metal or plastic which may optionally have been coated with a primer.

* * * * *

UNITED STATES PATENT AND TRADEMARK OFFICE
CERTIFICATE OF CORRECTION

PATENT NO. : 5,304,400
DATED : April 19, 1994
INVENTOR(S) : Rolf Dhein et al

Page 1 of 2

It is certified that error appears in the above-indentified patent and that said Letters Patent is hereby corrected as shown below:

IN THE ABSTRACT:

On the title page, at line 9 of the Abstract, correct "200 mg KOH/G" to --200 mg KOH/g--.

At line 10 of the Abstract, correct "250 mg KOH/G" to --250 mg KOH/g--.

At line 23 of the Abstract, correct "temperature of 40 to" to read --temperature of 40 to 160°C.--.

At column 1, line 68, correct "200 mg KOH/G" to --200 mg KOH/g--.
At column 2, line 1, correct "250 mg KOH/G" to --250 mg KOH/g--.
At column 2, line 52, correct "100 9 of solids" to --100 g of solids--.
At column 2, line 55, correct "carboxyl ate" to --carboxylate--.
At column 5, line 35, correct "bioret" to --biuret--.
At column 5, line 40, correct "bioret" to --biuret--.
At column 7, line 37, correct "bioret" to --biuret--.
At column 7, line 64, correct "bioret" to --biuret--.
At column 8, line 6, correct "polyethoxylatiod" to --polyethoxylation--.

UNITED STATES PATENT AND TRADEMARK OFFICE
CERTIFICATE OF CORRECTION

PATENT NO. : 5,304,400
DATED      : April 19, 1994
INVENTOR(S): Rolf Dhein et al It is certified that error appears in the above-indentified patent and that said Letters Patent is hereby corrected as shown below:

At column 8, line 46, correct "bioret" to --biuret--.
At column 8, line 56, correct "Henkel KGAA" to --Henkel KGaA--.

In Claim 1, at line 15, correct "comprisin" to --comprising--.
In Claim 1, at line 20, correct "200 mg KOH/G" to --200 mg KOH/g--.
In Claim 1, at line 21, correct "250 mg KOH/G" to --250 mg KOH/g--.

Signed and Sealed this

First Day of November, 1994

BRUCE LEHMAN

*Attest:*

*Attesting Officer*              Commissioner of Patents and Trademarks